Figure 1:
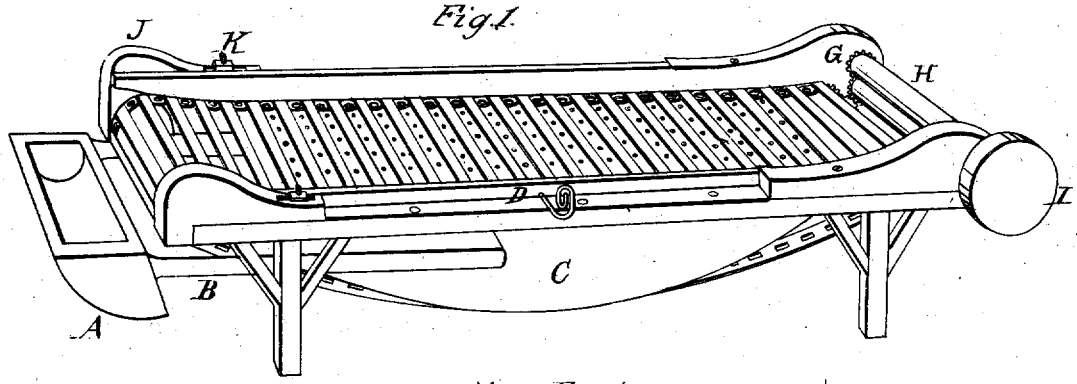
Figure 5:
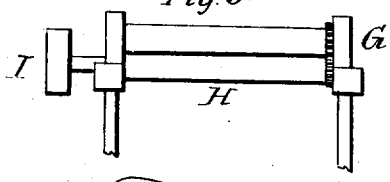
Figure 4:
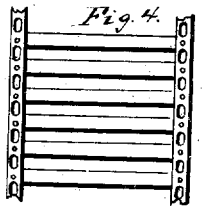
Figure 2:
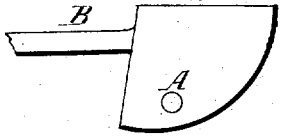
Figure 3:
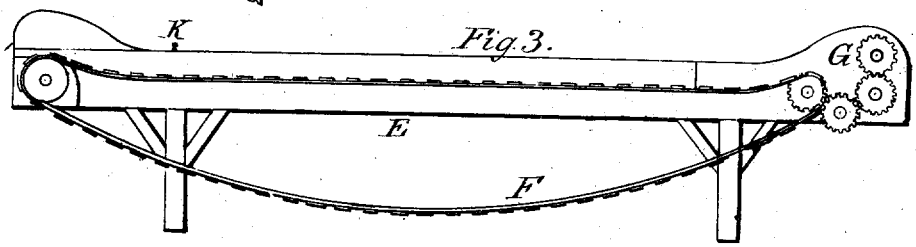

G. L. Mason.
Carding Mach.

No. 133. Reissued Mar. 20, 1849.

N. PETERS, PHOTO-LITHOGRAPHER, WASHINGTON, D. C.

UNITED STATES PATENT OFFICE.

GEORGE L. MASON, OF WILLISTON, VERMONT.

IMPROVEMENT IN PREPARING WOOL AND COTTON FOR CARDING.

Specification forming part of Letters Patent No. 5,274, dated September 4, 1847; Reissue No. 133, dated March 20, 1849.

*To all whom it may concern:*

Be it known that I, GEORGE L. MASON, of Williston, in the county of Chittenden and State of Vermont, have invented a new and improved manner of softening and rendering pliable the fibers of wool or other fibrous material preparatory to or during the process of carding and spinning; and I do hereby declare the following to be a full and exact description of the distinguishing characteristics and operation of my invention.

The nature of my invention consists in making the fibers of wool (or other fibrous material) sufficiently soft, pliable, and yielding for passing through the operations of carding and spinning, by thoroughly penetrating each fiber thereof with steam just previous to and during the operations of carding and spinning, by which I am enabled to dispense with the use of oil for softening the fibers of wool preparatory to performing the above-named operations upon the same. The steam may be applied to the wool or other fibrous material by means of a steam-chamber, C, having minute perforations in its upper surface, and combined with the endless apron that conducts the wool to the feeding-rollers of the breaker, or first carding-machine in a set, as represented in the accompanying drawing, or the steam may be admitted to the wool through perforated pipes located in such positions that the jets of steam issuing from them will thoroughly penetrate every fiber of the fibrous material. The rovings formed by the breaker are operated upon by steam in any convenient manner during their passage from the spools to the second carding-machine of the set, and the rovings formed by the second carding-machine are also acted upon by steam as they pass from the spools to the feeding-rollers of the third carding-machine, and so on through the entire set of machines. The finished rovings are acted upon by steam after they are placed in the jack and during the operation of spinning, in any convenient manner, by which the requisite warmth, softness, and flexibility will be imparted to their fibers.

The following are some of the advantages that will result from my improved manner of softening and rendering the fibers of wool, &c., flexible preparatory to and during the operations of carding and spinning when compared with the usual process of softening the wool preparatory to carding and spinning by the application of oil: first, a saving of the cost of the oil; second, a saving of the cost of the soap and alkalies required for cleansing the yarn or cloth from oil; third, preventing injury to delicate fabrics by the scouring operation required to cleanse them where oil has been used in their manufacture; fourth, preventing injury to certain colors by the use of the alkalies required for cleansing the yarn or cloth when oil has been employed in their manufacture; fifth, the fibers being rendered more soft and pliable by the action of steam than they can be made by the use of oil, the yarns formed from fibers softened and rendered flexible by steam are rounder, more compact, smoother, more elastic, and less liable to kink; consequently, a less quantity of sizing will be required for preparing them for the loom.

What I claim as my invention, and desire to secure by Letters Patent, is—

1. The application of heat and moisture to wool by means of steam for the purpose of rendering its fibers sufficiently soft, flexible, and pliable to pass through the operations of carding and spinning without requiring the use of oil upon the same.

2. The application of steam to cotton or other soft-fibered substance for the purpose of giving additional softness and flexibility to their fibers during the operations of carding and spinning.

GEO. L. MASON.

Witnesses:

Z. C. ROBBINS,

STEPHEN THOMAS.